(12) United States Patent
Dobashi

(10) Patent No.: US 7,359,568 B2
(45) Date of Patent: Apr. 15, 2008

(54) IMAGE PROCESSING APPARATUS AND IMAGE PROCESSING METHOD

(75) Inventor: Toshimasa Dobashi, Kawasaki (JP)

(73) Assignees: Toshiba Solutions Corporation, Tokyo (JP); Kabushiki Kaisha Toshiba, Tokyo (JP)

( * ) Notice: Subject to any disclaimer, the term of this patent is extended or adjusted under 35 U.S.C. 154(b) by 613 days.

(21) Appl. No.: 11/071,457

(22) Filed: Mar. 4, 2005

(65) Prior Publication Data
US 2005/0219581 A1 Oct. 6, 2005

(30) Foreign Application Priority Data
Mar. 30, 2004 (JP) .......................... P2004-101431

(51) Int. Cl.
G06K 9/40 (2006.01)
G06K 9/00 (2006.01)

(52) U.S. Cl. ...................... 382/266; 382/181
(58) Field of Classification Search ................. 382/198
See application file for complete search history.

(56) References Cited

U.S. PATENT DOCUMENTS

| 5,390,264 | A | * | 2/1995 | Ishihara et al. ............. 382/260 |
| 6,041,145 | A | * | 3/2000 | Hayashi et al. ............. 382/268 |
| 6,788,825 | B1 | | 9/2004 | Fujino |
| 8,999,632 | | | 2/2006 | Yamaguchi |

FOREIGN PATENT DOCUMENTS

| JP | 11-308438 | 11/1999 |
| JP | 2001-101399 | 4/2001 |
| JP | 2001-175808 | 6/2001 |
| JP | 2002-262096 | 9/2002 |

* cited by examiner

Primary Examiner—Bhavesh M. Mehta
Assistant Examiner—Alex Liew
(74) Attorney, Agent, or Firm—Finnegan, Henderson, Farabow, Garrett & Dunner, L.L.P.

(57) ABSTRACT

Converting inputted information of an image into information suitable for the edge detection, and calculating difference value difference value of adjacent pixels of the image, and adding an absolute value of the difference value to the calculated difference value of the pixels corresponding to the adjacent pixels if the difference value is negative, to generate an edge image.

8 Claims, 14 Drawing Sheets (a) ORIGINAL IMAGE (b) DIFFERENCE VALUE (c) ABSOLUTE VALUE OF DIFFERENCE (d) RESULT OF MOVING ADD

ORIGINAL IMAGE

CONVENTIONAL EDGE IMAGE

EDGE IMAGE OF PRESENT INVENTION

ORIGINAL IMAGE

CONVENTIONAL EDGE IMAGE

EDGE IMAGE OF PRESENT INVENTION

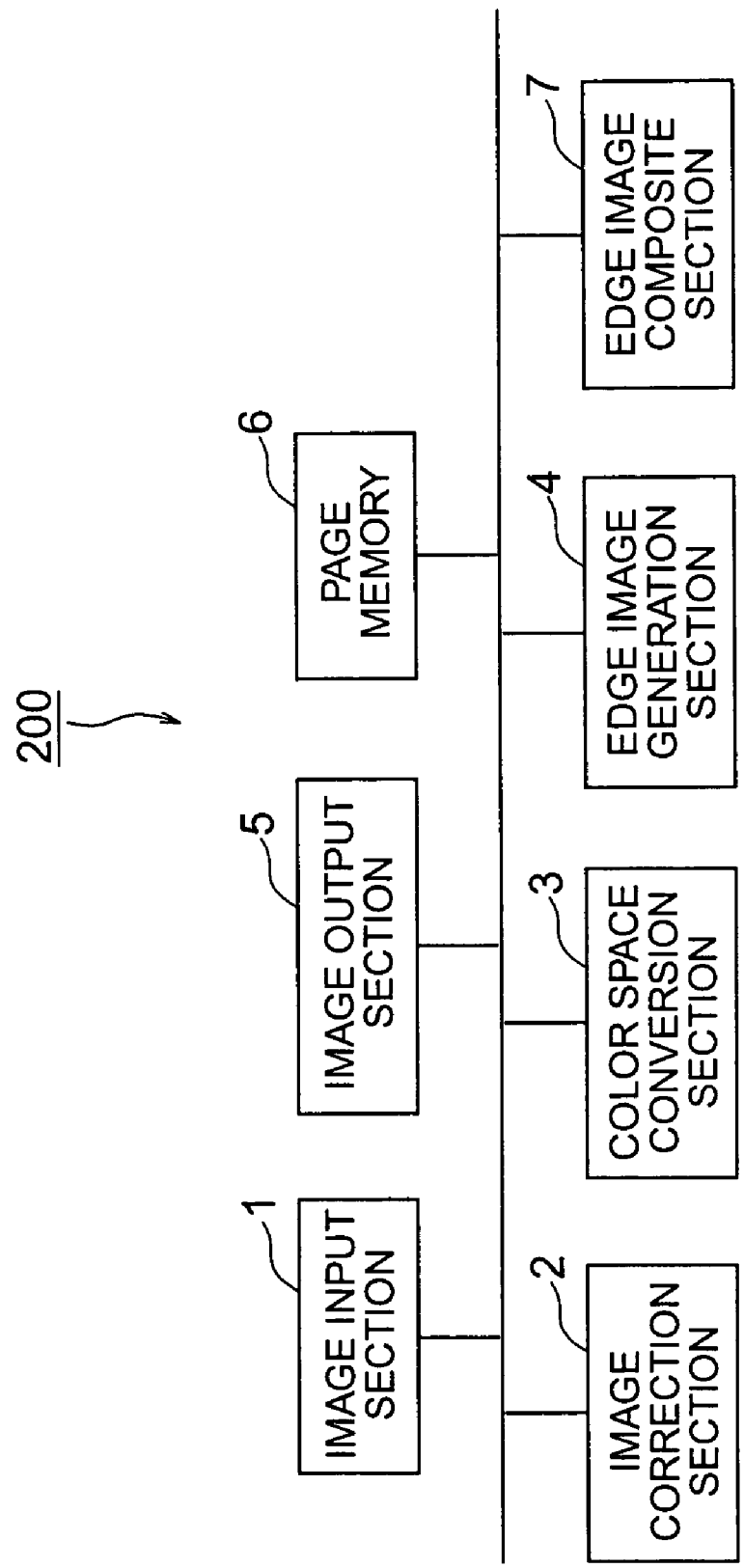

FIG. 10A

ORIGINAL IMAGE | A B C D E F G H I J

FIG. 10B f'(x,y) | A B C D E F G H I J

FIG. 10C f' inv(x,y) | A B C D E F G H I J

FIG. 11
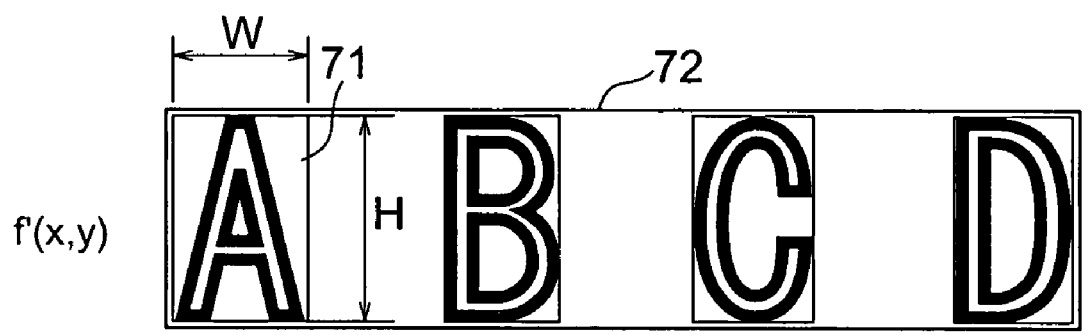
f'(x,y)
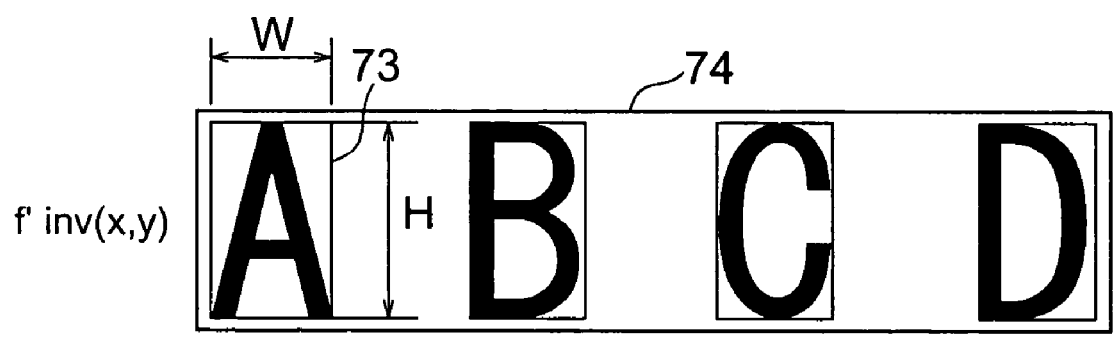
f' inv(x,y)

ORIGINAL IMAGE

EDGE IMAGE

OUTPUT IMAGE

IMAGE PROCESSING APPARATUS AND IMAGE PROCESSING METHOD

CROSS-REFERENCE TO THE INVENTION

This application is based upon and claims the benefit of priority from the prior Japanese Patent Application No. 2004-101431, filed on Mar. 30, 2004; the entire contents of which are incorporated herein by reference.

BACKGROUND OF THE INVENTION

1. Field of the Invention

The present invention relates to an image processing apparatus and an image processing method generating an edge image of characters from a color document, gray scale document and the like.

2. Description of the Related Art

In character recognition technology for a color document, gray scale document and the like, a technique called edge detection is used in order to obtain an image in which outlines of characters in the document are separated from the background. This edge detection is a method of detecting a change in value (difference value) of density, color and the like between adjacent pixels (refer to Japanese Patent Laid-open Application No. 2001-175808 (paragraph 0010 and soon), for example). Thereby, the edge image corresponding to the outlines of the characters can be obtained from, for example, the image in which the density of the characters is higher than the density of the background, and the like.

However, when the edge image is generated by using absolute values of the difference values of the density, color and the like between the adjacent pixels as they are, there are tendencies that the so-called inside void is caused with the part along the outline of the character being thick and inside thereof being light, and line width of the character broadens. This causes the problems that the characters contact each other and the image with high readability of characters is hardly obtained.

SUMMARY OF THE INVENTION

According to an aspect of the present invention, an image processing apparatus for processing the image constituted by a group of pixels comprises an input section inputting information of an image, a conversion section converting the information of the image inputted by said input section into information suitable for edge detection, and an image processing section calculating a difference value of adjacent pixels of the image based on the converted information of the image, and adding an absolute value of the difference value to the calculated difference value of the pixels corresponding to the adjacent pixels if the difference value is negative, to generate an edge image.

According to an aspect of the present invention, an image processing method for processing the image constituted by a group of pixels comprises converting inputted information of an image into information suitable for the edge detection, calculating a difference value of adjacent pixels of the image based on the converted information of the image and adding an absolute value of the difference value to the calculated difference value of the pixels corresponding to the adjacent pixels if the difference value is negative, to generate an edge image.

BRIEF DESCRIPTION OF THE DRAWINGS

The present invention will be described with reference to the drawings, but these drawings are presented only for illustrative purposes and are by no means intended to limit the invention.

FIG. 6 is a block diagram showing the configuration of an image processing apparatus according to a second embodiment of the present invention.

FIGS. 10A, 10B and 10C are views showing examples of an edge image for noninverted characters and an edge image for inverted characters.

FIG. 11 is views showing the method of calculating the size of character areas.

DESCRIPTION OF THE EMBODIMENTS

Hereinafter, embodiments of the present invention will be explained with reference to the drawings.

Figure 1:
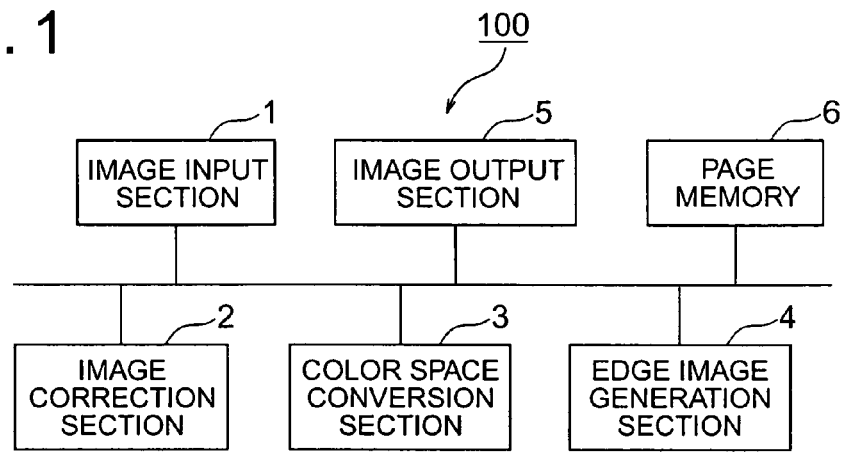
FIG. 1 is a block diagram showing the configuration of an image processing apparatus according to a first embodiment of the present invention.

FIG. 1 is a block diagram showing the configuration of an image processing apparatus 100 according to a first embodiment of the present invention. As shown in the drawing, the image processing apparatus 100 includes an image input section 1, an image correction section 2, a color space conversion section 3, an edge image generation section 4, an image output section 5, and a page memory 6.

The image input section 1 is a means for inputting information of an image and, more specifically, it may be input devices such as a copying machine, scanner, facsimile and digital camera, or a means for inputting information of an image which is stored in advance in a storage device and the like. The image correction section 2 performs image correction such as mesh elimination processing by filtering and the like as preprocessing for the edge detection. The color space conversion section 3 converts the corrected image into density and/or color information suitable for the edge detection. The edge image generation section 4 generates an edge image from the image which is converted into the information suitable for the edge detection. The image output section 5 is a means for outputting the generated edge image and, more specifically, it may be output devices such as a copying machine, printer, facsimile and display, or a means for outputting the filed edge image to the storage device and the like. The page memory 6 is a memory in which the information of the inputted image and the information of the image in the course of the respective processing are stored.

Next, the operation of the image processing apparatus 100 according to this embodiment will be explained.

Figure 2:
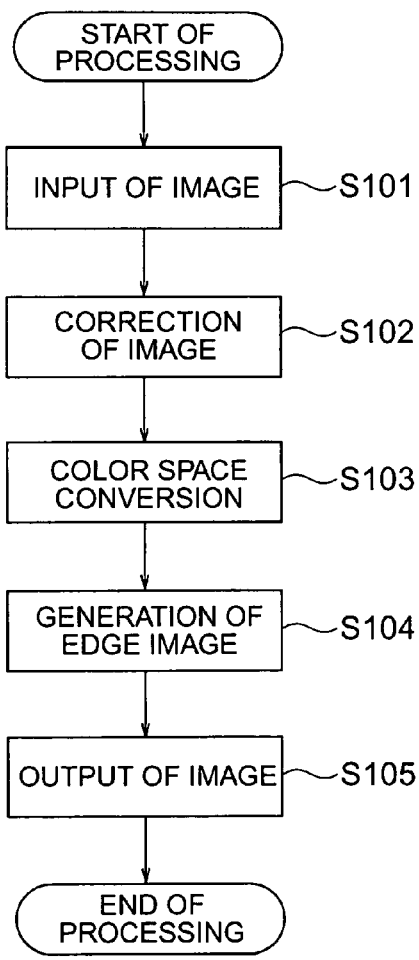
FIG. 2 is a flowchart showing the flow of the processing of the image processing apparatus according to the first embodiment.

FIG. 2 is a flowchart showing the flow of the processing of the image processing apparatus 100 according to the first embodiment.

First, the image information in full color or gray scale is inputted by the image input section 1, and is stored in the page memory 6 (step S101). Then, the image correction section 2 performs the correction processing on the image stored in the page memory 6, such as the mesh elimination processing, for example (step S102). Next, the color space conversion section 3 converts the image information into density and/or color information suitable for the edge detection, for examples, the RGB values of the image can be converted into density, color saturation, hue component, brightness component, color chromaticity, and so on (step S103). Then, in the edge image generation section 4, the edge is detected in a main-scan direction and sub-scan direction, respectively, from the image converted into the information suitable for the edge detection, and the edge image is generated (step S104). Subsequently, the image output section 5 outputs the generated edge image (step S105).

Next, the procedure of the edge image generation in the step S104 will be explained using FIG. 3 and FIG. 4.

Figure 3:
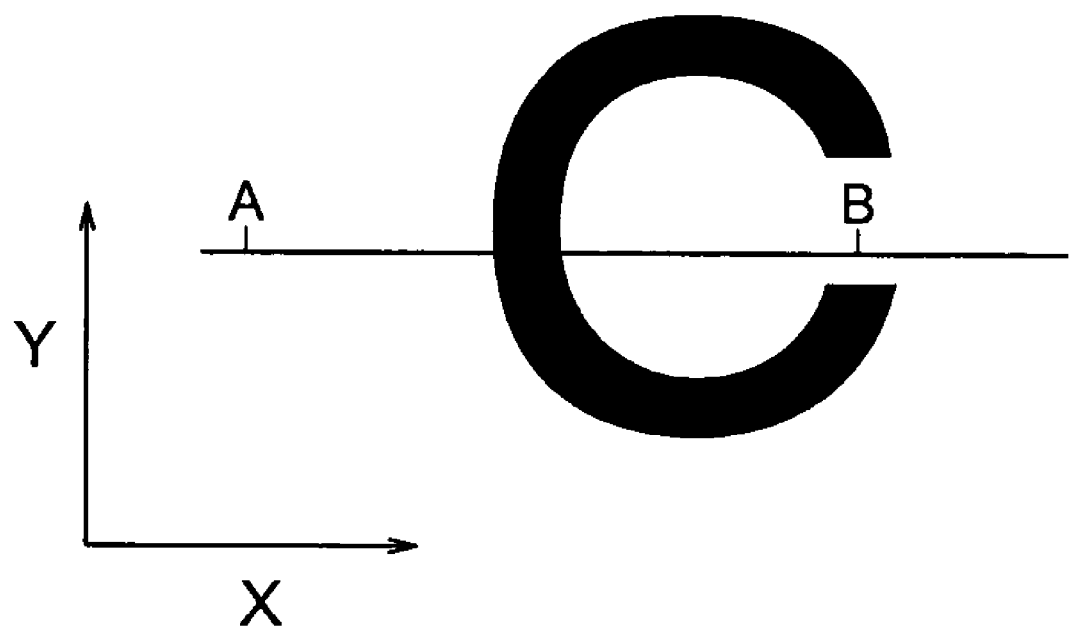
FIG. 3 is a view showing an example of an inputted original image.

FIG. 3 is an example of an inputted original image. This original image is constituted of a background and a character which is arranged against the background and is higher in density than the background. FIG. 4 shows how an edge image is generated according to the density from the original image shown in FIG. 3. In FIG. 4, graph (a) shows density distribution in the A-B zone in the direction of an x-axis of the original image in FIG. 3. In FIG. 4, graph (b) shows the result of difference processing of the density distribution in graph (a), calculated by the following expression (1).

$$f'(x)=f(x)-f(x-1) \tag{1}$$

here, f(x) is a density value of a pixel at a position (x) on the x-axis in the original image, f(x−1) is a density value of a pixel at a position (x−1) which is next to the pixel at the position (x) in the original image, and f'(x) is a density value (difference value) of a pixel at a position (x) in the edge image. Thus, the difference value in density between the pixels which are arranged next to each other is found for each of the pixels from the density distribution. It should be noted that the word "pixel" is a unit dividing a image. A unit of the image processing is not limited to a pixel. A group of N×N (N is an arbitrary integer number) pixels may be the unit of the image processing.

Figure 4:
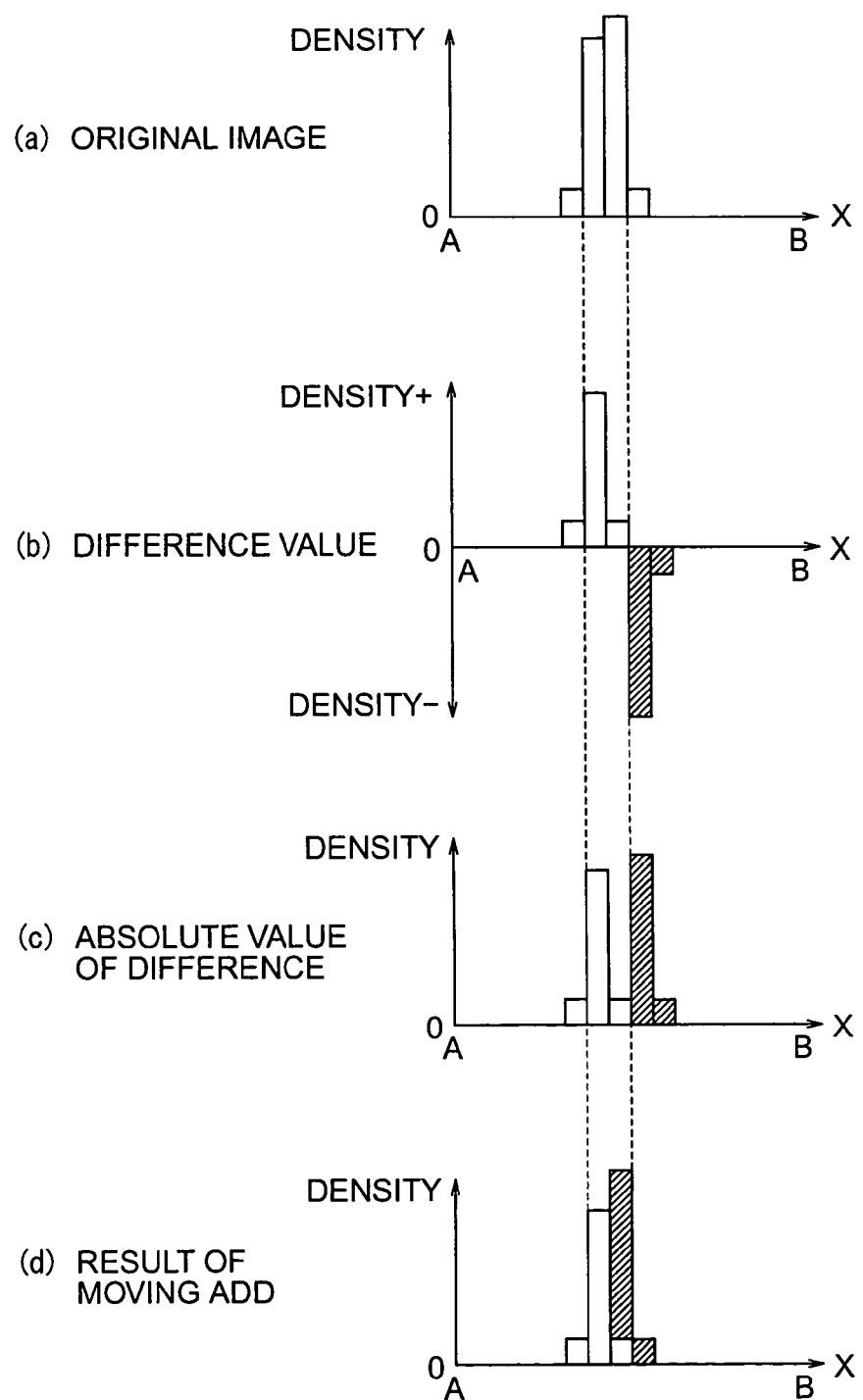
FIG. 4 is a view showing how an edge image is generated from the original image shown in FIG. 3.

By obtaining absolute values of the difference values in the graph (b), the edge corresponding to the outline of the character is detected as shown in graph (c) in FIG. 4. However, since an inside void exists in the character and a character segment remains thick by the width of the pixel, it can be hardly said that this edge image has high readability of characters in this state.

For this reason, as shown in graph (d) in FIG. 4, the absolute values of the negative difference values are respectively moved by one pixel to the difference values of the next pixels, and added thereto. In the example shown in the graph (d), the absolute values are moved by one pixel in the direction reducing the value of the x coordinate in the direction of the x-axis (left), and added thereto.

Incidentally, when the expression (1) is changed to the following expression, $$f'(x)=f(x)-f(x+1) \tag{1'}$$

the absolute values of the negative difference values may be moved by one pixel in the direction increasing the value of the x coordinate in the direction of the x-axis (right), and added thereto.

Although the case of generating the edge image from the original image according to the density in one axial direction (x-axis direction) is shown in FIG. 4, it is needless to say that the same processing may be performed in biaxial directions (x-axis direction and y-axis direction) to generate an edge image by composing the processing results in the respective directions. An example of calculation in this case is shown as follows.

Assuming that f(x, y) is a density value of a pixel at a coordinate position (x, y) in the original image, and f'(x, y) is a density value of a pixel at a coordinate position (x, y) in the edge image, the edge image is calculated by the following expression (2).

$$f'(x, y)=fx'(x, y)+fy'(x, y) \tag{2}$$

here, fx=f(x, y−1)−f(x−1, y−1)+f(x, y)−f(x−1, y)+f(x, y+1)−f(x−1, y+1), where, if f(x)>=0, fx'(x, y)=fx, and if fx<0, fx'(x, y)=fx'(x−1, y)−fx.

Further, fy=f(x−1, y)−f(x−1, y−1)+f(x, y)−f(x, y−1)+f(x+1, y)−f(x+1, y−1), where, if fy>=0, fy'(x, y)=fy, and if fy<0, fy'(x, y)=fy'(x, y−1)−fy.

Figure 5A:
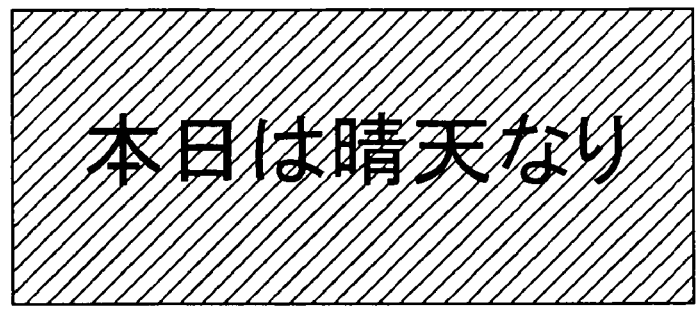
FIGS. 5A, 5B and 5C are views showing the edge image obtained by the image processing apparatus according to the first embodiment by making a comparison with an edge image obtained by the conventional method.
Figure 5B:
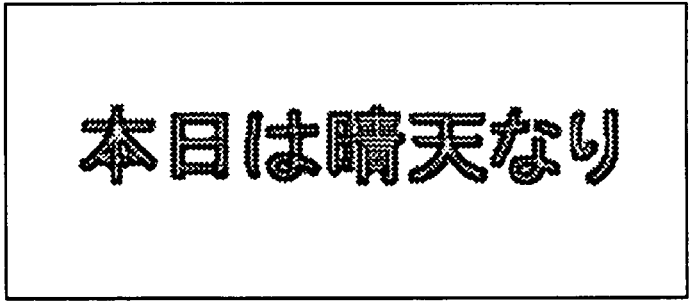
Figure 5C:

In FIGS. 5A, 5B and 5C, the edge image obtained by the image processing apparatus 100 according to this embodiment is shown by making a comparison with an edge image obtained by the conventional method. FIG. 5A is an example of the original image, FIG. 5B shows the edge image obtained by obtaining absolute values of difference values from the original image, and FIG. 5C shows the edge image obtained by this embodiment. As is clear from the comparison between the edge images of FIG. 5B and FIG. 5C, this embodiment can prevent line width of the character from broadening and the inside void of the character from being caused in the edge image, so that the edge image having high readability of characters can be obtained.

Next, a second embodiment of the present invention will be explained.

FIG. 6 is a block diagram showing the configuration of an image processing apparatus 200 according to the second embodiment of the present invention. As shown in the drawing, the image processing apparatus 200 includes an image input section 1, an image correction section 2, a color space conversion section 3, an edge image generation section 4, an image output section 5, a page memory 6, and an edge image composite section 7. According to the first embodiment, the edge image generation section 4 generates one edge image such as the edge image of the density only, edge image of the color information only, or the like, whereas the edge image generation section 4 in the image processing apparatus 200 according to this embodiment simultaneously generates an edge image of the information of color space (for example, color saturation, hue component, brightness component, color chromaticity and so on), together with an edge image of the density. The edge image composite section 7 composes the plural edge images generated in the edge image generation section 4, and outputs it to the image output section 5. The functions of the rest of the blocks are the same as those of the first embodiment.

Figure 7:
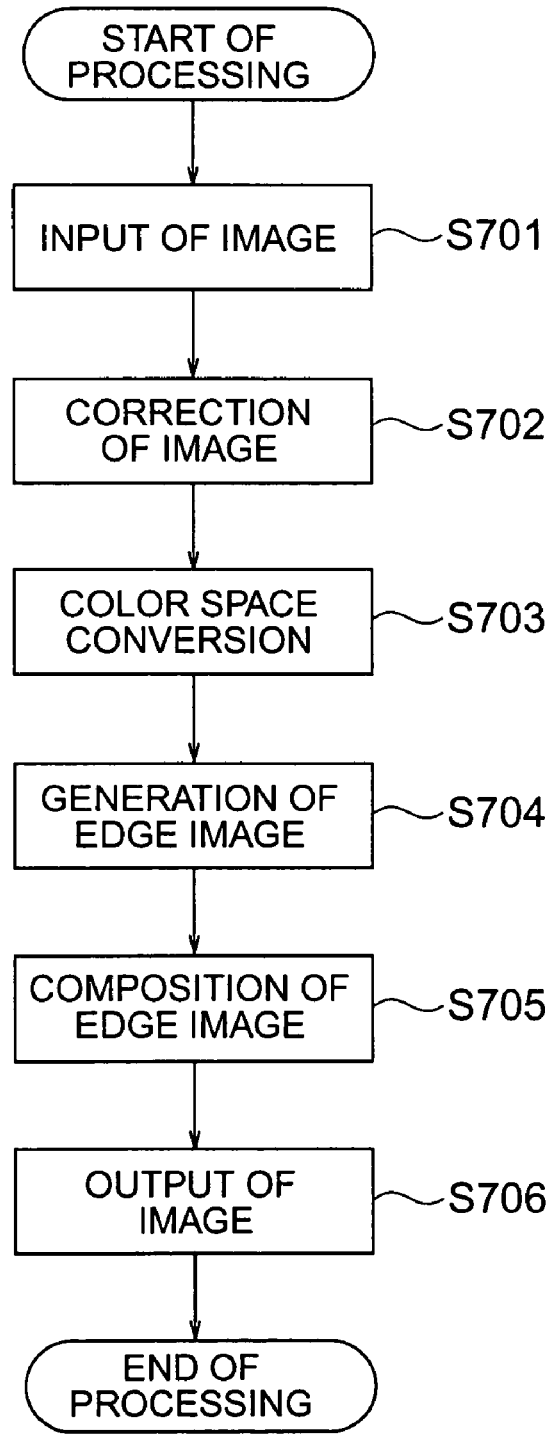
FIG. 7 is a flowchart showing the flow of the processing of the image processing apparatus according to the second embodiment.

FIG. 7 is a flowchart showing the flow of the processing of the image processing apparatus 200 according to the second embodiment.

First, the image information in full color or gray scale is inputted by the image input section 1, and is stored in the page memory 6 (step S701). Then, the image correction section 2 performs the correction process on the image stored in the page memory 6, such as the mesh elimination processing, for example (step S702). Next, the color space conversion section 3 converts the image information into density and/or color information suitable for the edge detection, for examples, the RGB values of the image can be converted into density, color saturation, hue component, brightness component, color chromaticity, and so on (step S703). Then, in the edge image generation section 4, the edge is detected according to the information of the density and the color information, respectively, in a main-scan direction and sub-scan direction, from the image converted into the information suitable for the edge detection, and the edge image of the density and the edge image of the color information are generated (step S704). At this time, the edge image of the density and the edge image of the color information are generated according to the same procedure as that of the first embodiment. Subsequently, the generated edge images are composed in the edge image composite section 7 (step S705), and are outputted as one composite edge image from the image output section 5 (step S706).

Composite methods of the edge images may be the method of adding weights corresponding to the attributes of the information (density, color saturation, hue component, brightness component, color chromaticity, and so on) to the values of the pixels of the respective edge images to regard the average values of those as the composite edge image, and the method of adding weights corresponding to the attributes of the color information to the values of the pixels of the respective edge images to regard the collection of the pixels having maximum values as the composite edge image, and the like.

As described thus far, according to the image processing apparatus 200 of the second embodiment, the conversion section converts the inputted information of the image into the density and color information, and the image processing section generates the edge images for the density and color information, respectively, obtained by the conversion section, and composes the edge images to generate one edge image.

Therefore, according to the image processing apparatus 200 of the second embodiment, it is possible to obtain the edge image with high readability of characters for various combinations of characters and backgrounds having the different density and colors.

Next, a third embodiment of the present invention will be explained.

Figure 8:
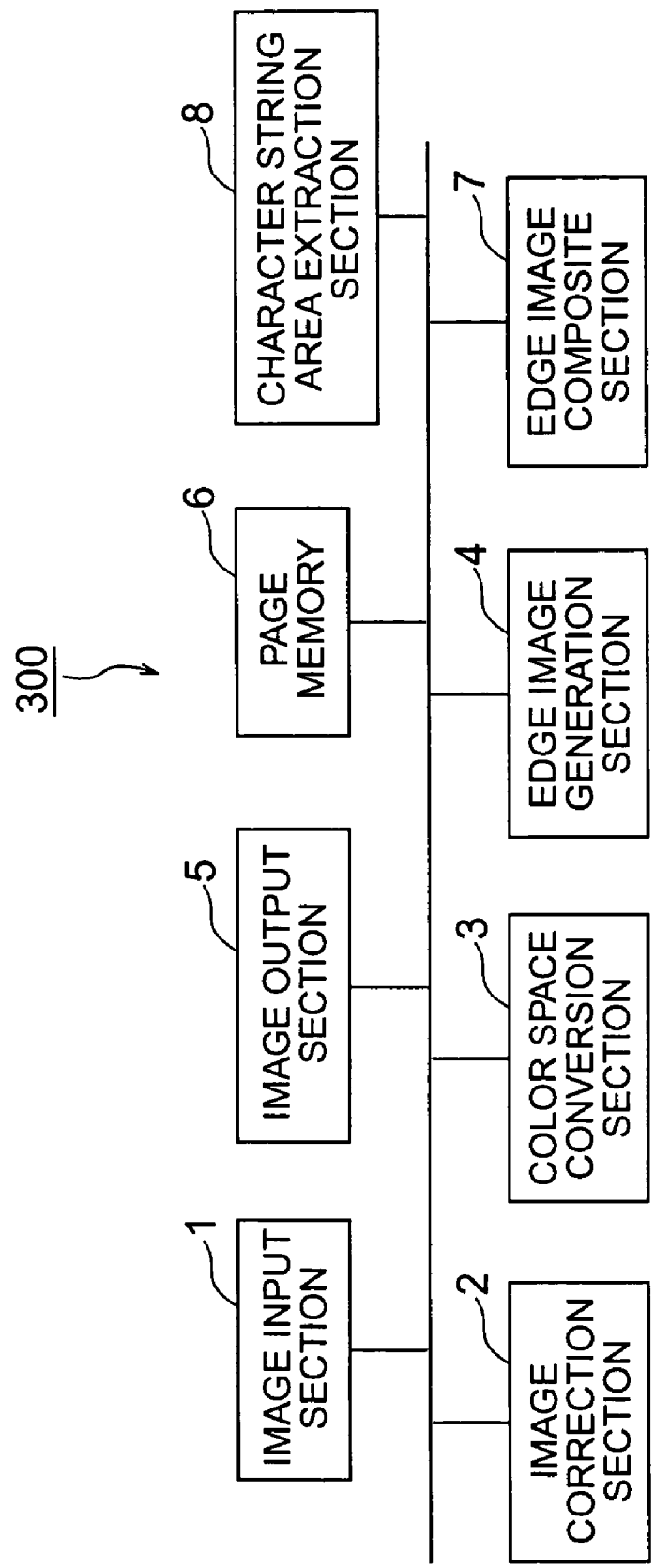
FIG. 8 is a block diagram showing the configuration of an image processing apparatus according to a third embodiment of the present invention.

FIG. 8 is a block diagram showing the configuration of an image processing apparatus 300 according to the third embodiment of the present invention. As shown in the drawing, the image processing apparatus 300 includes an image input section 1, an image correction section 2, a color space conversion section 3, an edge image generation section 4, an image output section 5, a page memory 6, an edge image composite section 7, and a character string area extraction section 8. In this image processing apparatus 300, the character string are a extraction section 8 extracts a character string area from an edge image and calculates the size of respective character areas and an average value thereof. Moreover, the edge image generation section 4 has the additional function of generating an edge image for inverted characters and an edge image for noninverted characters from one original image. The edge image composite section 7 has the function of selecting either the edge image for the inverted characters or the edge image for the noninverted characters generated in the edge image generation section 4, based on the average value in size of the character areas for each character string area which is calculated by the character string area extraction section 8, and performing composition to generate one edge image. The functions of the rest of the blocks are the same as those of the first embodiment.

Figure 9:
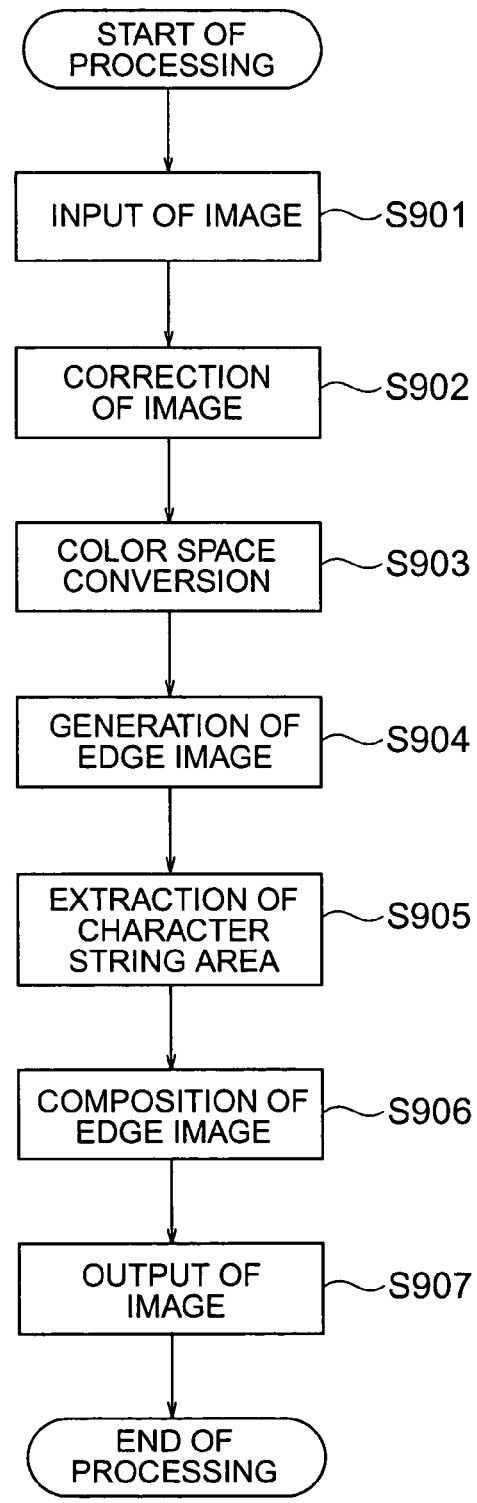
FIG. 9 is a flowchart showing the flow of the processing of the image processing apparatus according to the third embodiment.

FIG. 9 is a flowchart showing the flow of the processing of the image processing apparatus 300 according to the third embodiment.

First, the image information in full color or gray scale is inputted by the image input section 1, and is stored in the page memory 6 (step S901). Then, the image correction section 2 performs the correction process on the image stored in the page memory 6, such as the mesh elimination processing, for example (step S902). Next, the color space conversion section 3 converts the image information into density and/or color information suitable for the edge detection, for examples, the RGB values of the image can be converted into density, color saturation, hue component, brightness component, color chromaticity, and so on (step S903). Subsequently, in the edge image generation section 4, the edge is detected from the image converted into the information suitable for the edge detection in a main-scan direction and sub-scan direction, respectively, and the edge image for the noninverted characters f'(x, y) and the edge image for the inverted characters f'inv(x, y) are generated (step S904).

The edge image f'inv(x, y) for the inverted characters is calculated by the following expression (3).

$$f'inv(x, y) = fx'(x, y) + fy'(x, y) \qquad (3)$$

here, fx=−{f(x, y−1)−f(x−1, y−1)+f(x, y)−f(x−1, y)+f(x, y+1)−f(x−1, y+1)}, where, if fx>=0, fx'(x, y)=fx, and if fx<0, fx'(x, y)=fx'(x−1, y)−fx.

Further, fy=−{f(x−1, y)−f(x−1, y−1)+f(x, y)−f(x, y−1)+f(x+1, y)−f(x+1, y−1)}, where, if fy>=0, fy'(x, y)=fy, and if fy<0, fy'(x, y)=fy'(x, y−1)−fy.

As a result of this, from the original image in FIG. 10A, for example, the edge image f'(x, y) for the noninverted characters as shown in FIG. 10B and the edge image f'inv(x, y) for the inverted characters as shown in FIG. 10C can be obtained. As shown in the drawing, the edge image f'(x, y) for the noninverted characters derived from the inverted characters has the characters in framing shapes. The same applies to the edge image f'inv(x, y) for the inverted characters derived from the noninverted characters.

Next, the character string area extraction section 8 extracts the character string area from the edge image f'(x, y) and the edge image f'inv(x, y) (step S905). The extraction of the character string area can be realized by the method of extracting connected components from the edge image by labeling process, and determining the area where the connected components are linearly arranged in a continuous manner to be the character string by performing layout analysis of the connected components, and the like. At this time, as shown in FIG. 11, assuming that each of the connected components is one character area 71 and 73, the width W and the height H of each character area 71 and 73 are found, and the average value of the values of the width W and the height H of each character area 71 and 73 is found for each of the character string areas 72 and 74 in which the character areas 71 and 73 are contained.

Figure 12:
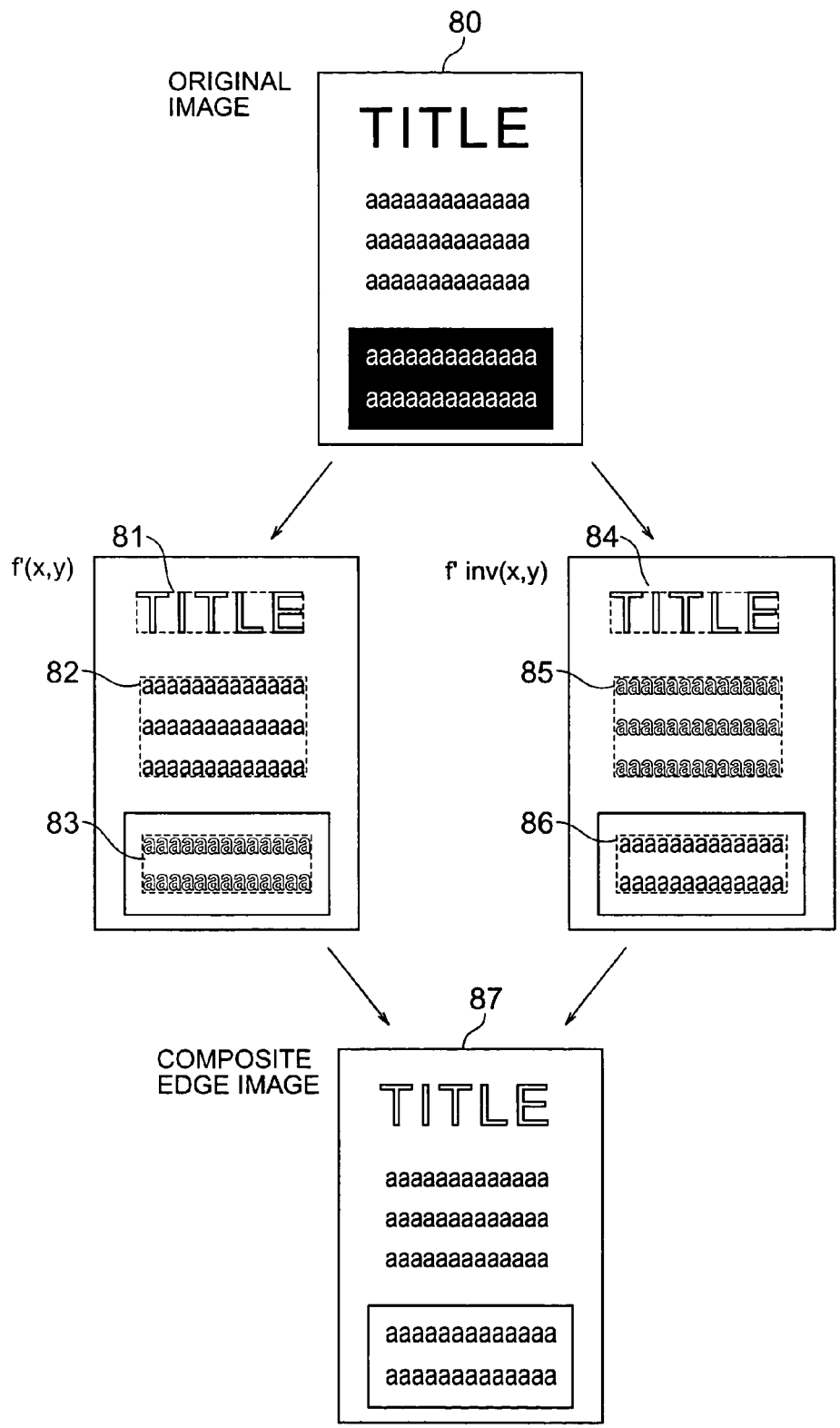
FIG. 12 is a view showing how edge images of an original image in which a character string of noninverted characters and a character string of inverted characters are mixed are composed.

For example, as shown in FIG. 12, the edge image f'(x, y) and the edge image f'inv(x, y) are obtained from an original image 80 in which the character strings of the noninverted characters and the character strings of the inverted characters are mixed, and six character string areas 81 to 86 are obtained.

Next, the edge image composite section 7 respectively selects the character string area with higher readability of characters, out of the corresponding character string areas in the edge image f'(x, y) and the edge image f'inv(x, y), to generate one composite edge image 87 (step S906). Incidentally, the character string area with higher readability of characters is determined based on the average value of the values of the width and height of the character areas for each of the character string areas.

More specifically, as shown in FIGS. 11, since the edge image f'(x, y) for the noninverted characters derived from the inverted characters have the characters in the framing shapes, the size of each character area 71 in this case is bigger than the size of the character area 73 having the character in a stroking shape which is obtained as the edge image f'inv(x, y) for the inverted characters derived from the inverted characters. The character in the stroking shape generally has higher readability than the character in the framing shape, and therefore the character string area having the smaller average value of the values of the width and height of the character areas may be determined to be the character string area with higher readability of characters.

As a result of this, in the example shown in FIG. 12, the character string areas 81, 82 and 86 are determined to be the character string areas with higher readability of characters, and the edge images of the character string areas 81, 82 and 86 are composed, whereby one composite edge image 87 is generated. Finally, the composite edge image 87 thus generated is outputted from the image output section 5 (step S907).

As described thus far, according to the image processing apparatus 300 of the third embodiment, the image input section inputs the information of the image in which the area of the noninverted characters and the area of the inverted characters are mixed, and the image processing section generates the edge image for the noninverted characters and the edge image for the inverted characters, selects either one edge image from the generated edge images for each character string area, and performs composition to generate one edge image. Particularly, the image processing section selects the edge image having the smaller average value in size of the character areas for each of the character string areas in which the character areas are contained, out of the respective edge images generated.

Therefore, according to the image processing apparatus 300 of the third embodiment, it is possible to generate the edge image with high readability of characters, from the document image in which the noninverted characters and inverted characters are mixed.

Next, a fourth embodiment of the present invention will be explained.

Figure 13:
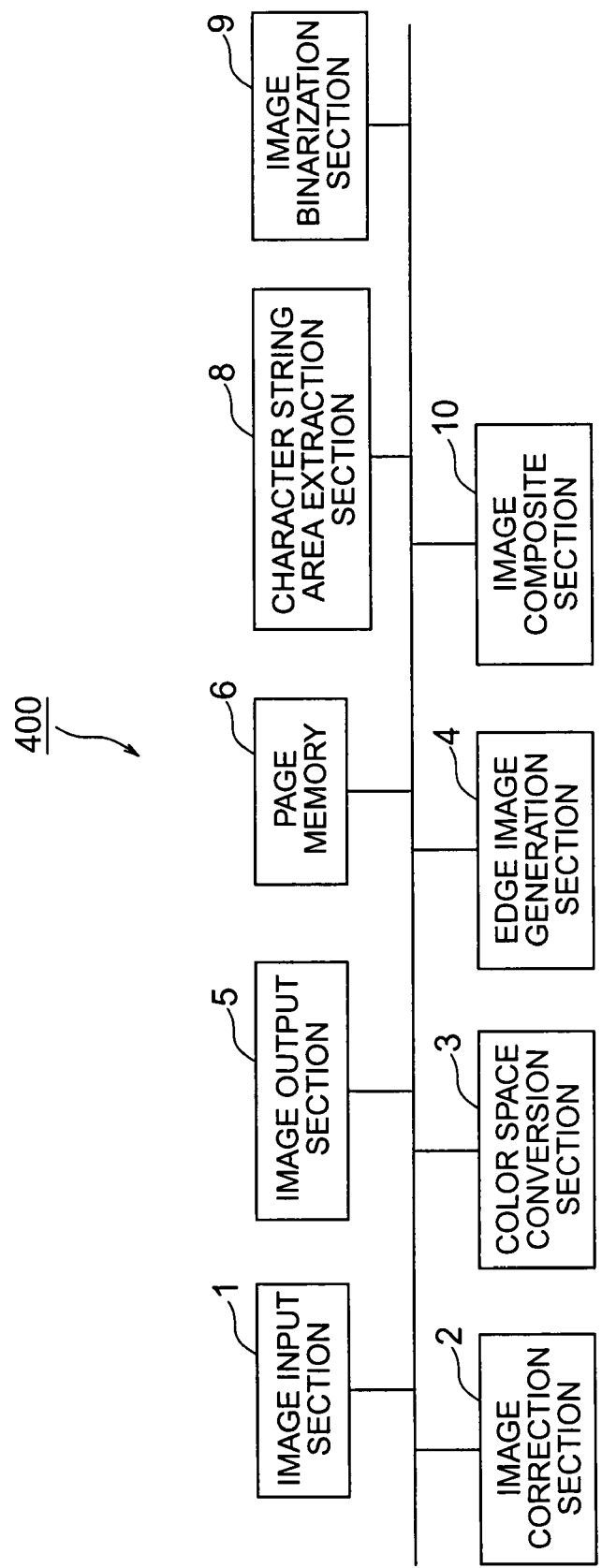
FIG. 13 is a block diagram showing the configuration of an image processing apparatus according to a fourth embodiment of the present invention.

FIG. 13 is a block diagram showing the configuration of an image processing apparatus 400 according to the fourth embodiment of the present invention. As shown in the drawing, the image processing apparatus 400 includes an image input section 1, an image correction section 2, a color space conversion section 3, an edge image generation section 4, an image output section 5, a page memory 6, a character string area extraction section 8, an image binarization section 9, and an image composite section 10. In this image processing apparatus 400, the character string area extraction section 8 extracts a character string area from an edge image and calculates the size of respective character areas and an average value thereof. The image binarization section 9 performs binarization processing of an original image inputted by the image input section 1. The image composite section 10 composes the edge image generated by the edge image generation section 4 and the binarized image generated by the image binarization section 9. The functions of the rest of the blocks are the same as those of the first embodiment shown in FIG. 1.

Figure 14:
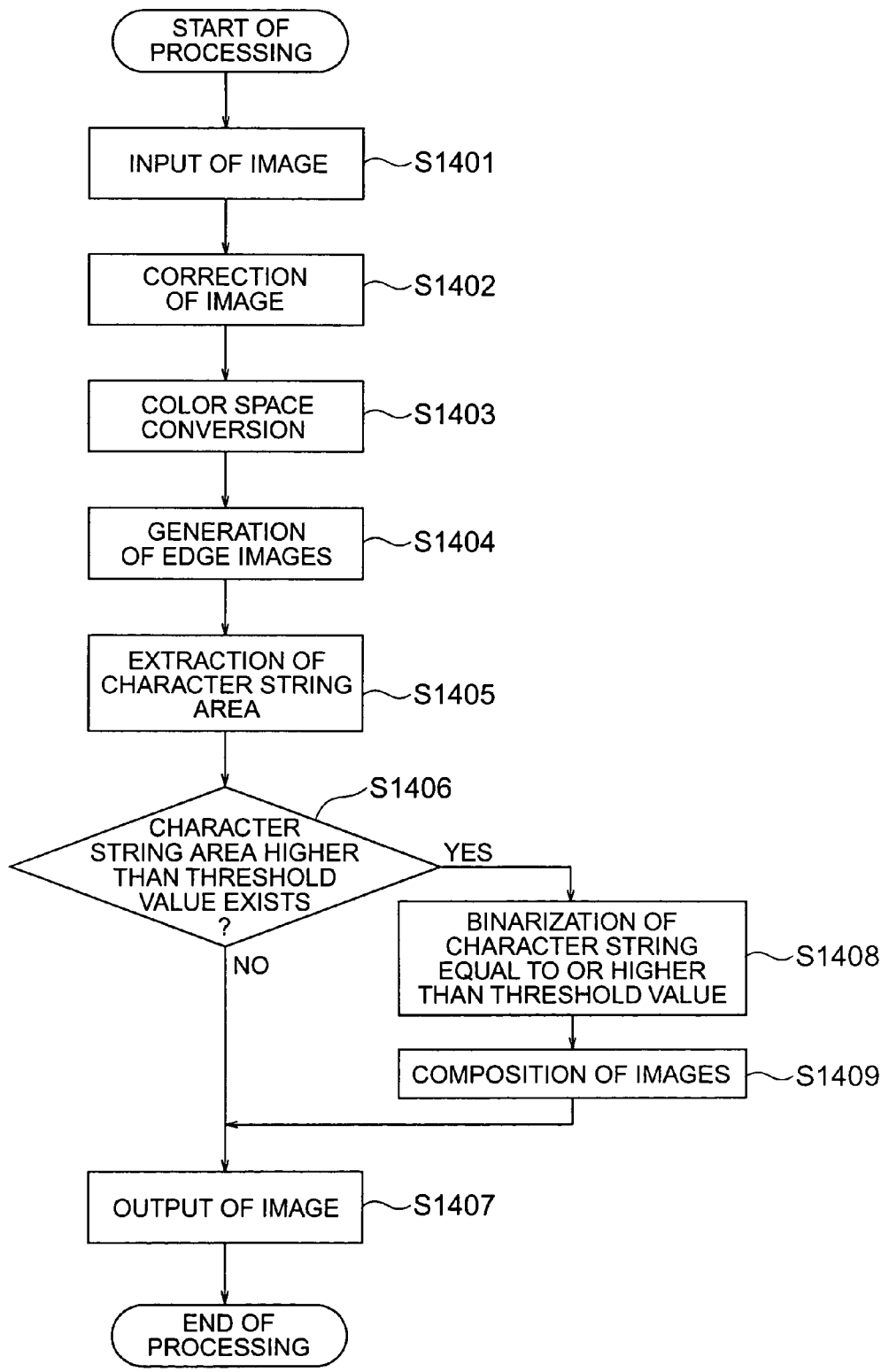
FIG. 14 is a flowchart showing the flow of the processing of the image processing apparatus according to the fourth embodiment.

FIG. 14 is a flowchart showing the flow of the processing of the image processing apparatus 400 according to the fourth embodiment.

First, the image information in full color or gray scale is inputted by the image input section 1, and is stored in the page memory 6 (step S1401). Then, the image correction section 2 performs the correction process on the image stored in the page memory 6, such as the mesh elimination processing, for example (step S1402). Next, the color space conversion section 3 converts the image information into density and/or color information suitable for the edge detection, for examples, the RGB values of the image can be converted into density, color saturation, hue component, brightness component, color chromaticity, and so on (step S1403). Then, in the edge image generation section 4, the edge is detected in a main-scan direction and sub-scan direction, respectively, from the image converted into the information suitable for the edge detection, and the edge image is generated (step S1404). At this time, the edge image is generated by the same procedure as that of the first embodiment.

Next, the character string area extraction section 8 extracts character string areas from the edge image, and calculates the average value of the values of the width and height of character areas for each character string area which contains the character areas (step S1405). Subsequently, the image composite section 10 evaluates the average value of the values of the width and height of the character areas of the character string area extracted from the edge image, with a threshold value as a reference (step S1406). When it is determined by this evaluation that the character string area whose average value of the values of the width and height of the character areas is equal to or higher than the threshold value does not exist (NO in step S1406), the edge image generated in the step S1404 is outputted from the image output section 5 (step S1407).

When there exists the character string area whose average value of the values of the width and height of the character areas is equal to or higher than the threshold value (YES in the step S1406), the image binarization section 9 performs the binarization processing of the original image in the character string area whose average value of the values of the width and height of the character areas is equal to or higher than the threshold value (step S1408). The binarization processing is preferably performed so that the background part and the character part are suitably separated, by taking a histogram or the like of the original image in the corresponding character string area. Moreover, when the characters in the original image are the inverted characters, the resultant values of the binarization processing of the background part and the character part are inverted so that the character part becomes black and outputted as the final binarized image.

When obtaining the binarized image from the image binarization section 9, the image composite section 10 adopts this binarized image instead of the edge image of the same character string area, composes it with the edge images or the binarized images of the other character string areas, to thereby generate one composite edge image (step S1409). Finally, the composite edge image thus generated is outputted from the image output section 5 (step S1407)

Figure 15A:
FIGS. 15A, 15B and 15C show an example of image processing of the image processing apparatus according to the fourth embodiment.
Figure 15B:
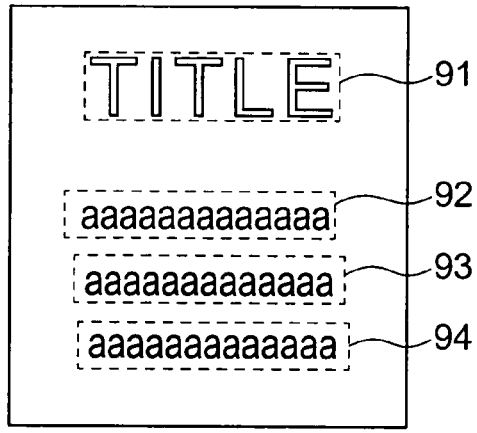
Figure 15C:

FIGS. 15A, 15B and 15C show a concrete example of the image processing described thus far. FIG. 15A shows an original image, FIG. 15B shows an edge image generated from the original image. It is supposed that the average value in size of the character areas contained in one character string area 91 in the image is equal to or higher than the threshold value, and the average values in size of the character areas contained in the other character string areas 92, 93 and 94 are lower than the threshold value. In generating the edge image according to this embodiment, moving by one pixel and addition thereto are performed, and therefore there is a limit to the character size which can benefit from the effect of the prevention of an inside void. When the size of the character exceeds this limit, the character consequently has a framing shape with the inside void. For this reason, in the character string area 91 whose average value in size of the character areas is equal to or higher than the threshold value, the binarized image of the original image is adopted instead of the edge image, and is composed with the edge images of the other character string areas 92, 93 and 94, to thereby generate one output image as shown in FIG. 15C.

Thus, according to the image processing apparatus 400 of the fourth embodiment, the image processing section determines the character string area whose average value in size of the character areas is equal to or higher than the threshold value in the generated edge image, generates the binarized image of the original image in this character string area, and composes this binarized image, instead of the edge image of the same character string area, with the images of the other character string areas.

Thereby, even when the character string are as with different character size are mixed in the original image, it is possible to obtain the image of the characters with high readability and without the inside void.

As described thus far, according to the image processing apparatus and image processing method of the respective embodiments of the present invention, it is possible to obtain the edge image with high readability of characters from the color document, gray scale document and the like.

Incidentally, the present invention is not limited to the above-illustrated embodiments, and any expansion and modification can be made without departing from a technical scope of the present invention.

For example, although the difference filter is used in detecting the edge in the above-described embodiments, it is also possible to use a secondary differential filter (Laplacian filter).

What is claimed is:

1. An image processing apparatus, comprising:
an input section inputting information of an image;
a converter converting the information of the image inputted by said input section into information suitable for edge detection; and
an image processor calculating a difference value of each image unit between adjacent image units mutually in a predetermined direction to generate an edge image based on the converted information of the image,
wherein the image processor adds an absolute value of the difference value of the image unit to a difference value of adjacent image unit to the image unit in the predetermined direction when the difference value of the image unit calculated by the image processor is negative,
wherein the input section inputs information of an image in which an area of noninverted characters and an area of inverted characters are mixed, and
wherein the image processor generates an edge image for the noninverted characters and an edge image for the inverted characters, selects either of the generated edge images for each character string area, and composes the selected edge images for each character string area to form one edge image.

2. An image processing apparatus according to claim 1, wherein said converter converts the inputted information of the image into density and color information, and
wherein said image processor generates edge images for each of the density and color information which are obtained by said converter, and composes these generated edge images to form one edge image.

3. An image processing apparatus according to claim 1, wherein said image processor selects, out of the generated edge images, the edge image whose average value in size of character areas contained in the character string area is smaller, for each character string area.

4. An image processing apparatus according to claim 1, wherein said image processor determines a character string area whose average value in size of character areas is equal to or higher than a threshold value in the generated edge image, generates a binarized image of an original image in this character string area, and composes this binarized image, instead of the edge image of the same character string area, with images of the other character string areas.

5. An image processing method, comprising:
converting inputted information of an image into information suitable for edge detection;
calculating a difference value of each image unit between adjacent image units mutually in a predetermined direction to generate an edge image based on the converted information of the image;
adding an absolute value of the difference value of the image unit to a difference value of adjacent image unit to the image unit in the predetermined direction when of the calculated difference value of the image unit is negative, to generate an edge image;
inputting information of an image in which an area of noninverted characters and an area of inverted characters are mixed;

generating from the inputted information of the image an edge image for the noninverted characters and an edge image for the inverted characters;

selecting either of the generated edge images for each character string area; and composing the selected edge images for each character string area to form one edge image.

6. An image processing method according to claim 5, further comprising:

converting the inputted information of the image into density and color information; and generating edge images for each of the density and color information after the conversion, and composing these generated edge images to form one edge image.

7. An image processing method according to claim 5, further comprising:

selecting, out of the generated edge images, the edge image whose average value in size of character areas contained in the character string area is smaller, for each character string area.

8. An image processing method according to claim 5, further comprising:

determining a character string area whose average value in size of character areas is equal to or higher than a threshold value in the generated edge image, generating a binarized image of an original image in this character string area, and composing this binarized image, instead of the edge image of the same character string area, with images of the other character string areas.

* * * * *

UNITED STATES PATENT AND TRADEMARK OFFICE
CERTIFICATE OF CORRECTION

| | |
|---|---|
| PATENT NO. | : 7,359,568 B2 |
| APPLICATION NO. | : 11/071457 |
| DATED | : April 15, 2008 |
| INVENTOR(S) | : Dobashi |

It is certified that error appears in the above-identified patent and that said Letters Patent is hereby corrected as shown below:

Title page, item (57), lines 2-3, change "calculating difference value difference value of" to --calculating a difference value of--.

\* Claim 5, column 10, lines 62-63, change "when of the" to --when the--.

Signed and Sealed this

Fifth Day of August, 2008

JON W. DUDAS
*Director of the United States Patent and Trademark Office*